US008132721B2

(12) United States Patent
Carapelli

(10) Patent No.: US 8,132,721 B2
(45) Date of Patent: Mar. 13, 2012

(54) DEVICE FOR CHECKING THE REGULARITY OF THE OPERATION OF AUTOMATIC PAYMENT TERMINALS

(75) Inventor: Giovanni Carapelli, Florence (IT)

(73) Assignee: Gilbarco Inc., Greensboro, NC (US)

( * ) Notice: Subject to any disclaimer, the term of this patent is extended or adjusted under 35 U.S.C. 154(b) by 586 days.

(21) Appl. No.: 12/294,189

(22) PCT Filed: Mar. 22, 2007

(86) PCT No.: PCT/IB2007/000791

§ 371 (c)(1), (2), (4) Date: Sep. 23, 2008

(87) PCT Pub. No.: WO2007/107876

PCT Pub. Date: Sep. 27, 2007

(65) Prior Publication Data

US 2009/0045254 A1 Feb. 19, 2009

(30) Foreign Application Priority Data

Mar. 23, 2006 (IT) ................................ FI2006A0077

(51) Int. Cl.
*G06K 5/00* (2006.01)

(52) U.S. Cl. ......................... 235/380; 235/449; 235/451

(58) Field of Classification Search .................. 235/380, 235/449, 451, 439
See application file for complete search history.

(56) References Cited

U.S. PATENT DOCUMENTS

| | | | | |
|---|---|---|---|---|
| 3,594,770 | A | 7/1971 | Ham et al. | |
| 3,772,674 | A | 11/1973 | Jackson | |
| 5,012,075 | A | 4/1991 | Hutchison et al. | |
| 5,539,379 | A | 7/1996 | MacPherson | |
| 6,646,565 | B1 | 11/2003 | Fu et al. | |
| 2004/0035929 | A1* | 2/2004 | Okada | 235/438 |
| 2004/0195001 | A1 | 10/2004 | Farquhar et al. | |
| 2004/0200894 | A1 | 10/2004 | Ramachandran et al. | |
| 2005/0151645 | A1 | 7/2005 | Meskens et al. | |
| 2005/0275538 | A1 | 12/2005 | Kulpa | |
| 2006/0138241 | A1* | 6/2006 | Kitazawa | 235/475 |
| 2006/0169764 | A1 | 8/2006 | Ross et al. | |
| 2007/0057070 | A1* | 3/2007 | Scarafile et al. | 235/475 |
| 2007/0199984 | A1* | 8/2007 | Ramachandran et al. | 235/379 |

FOREIGN PATENT DOCUMENTS

| | | | |
|---|---|---|---|
| AU | 74241/87 | B | 1/1988 |
| DE | 19705518 | A1 | 8/1998 |
| EP | 0082861 | B1 | 7/1983 |
| EP | 0347209 | B1 | 12/1989 |

(Continued)

OTHER PUBLICATIONS

International Search Report & Written Opinion for corresponding Patent Cooperation Treaty Patent Application PCT/IB2007/000791, Oct. 24, 2007.

*Primary Examiner* — Ahshik Kim

(74) *Attorney, Agent, or Firm* — Nelson Mullins Riley & Scarborough LLP

(57) ABSTRACT

There is described a device for the control and surveillance to check the regularity of the operation of automatic payment terminals, specifically automatic terminals employing payment card readers of the contact-type.

18 Claims, 1 Drawing Sheet

FOREIGN PATENT DOCUMENTS

| | | | |
|---|---|---|---|
| EP | 0526066 | B1 | 2/1993 |
| EP | 0902607 | A2 | 3/1999 |
| EP | 0924592 | A3 | 11/1999 |
| EP | 1126358 | A1 | 8/2001 |
| EP | 1 394 728 | A1 | 3/2004 |
| EP | 1 530 150 | A1 | 5/2005 |
| EP | 1557736 | A2 | 7/2005 |
| EP | 1 615 184 | A1 | 1/2006 |
| GB | 2297540 | A | 8/1996 |
| WO | W003/019467 | A1 | 3/2003 |
| WO | 2005/001598 | A2 | 1/2005 |
| WO | W02005/041002 | A1 | 5/2005 |

* cited by examiner

DEVICE FOR CHECKING THE REGULARITY OF THE OPERATION OF AUTOMATIC PAYMENT TERMINALS

FIELD OF THE INVENTION

The present invention relates to the field of control and surveillance devices for checking the regularity of the operation of automatic payment terminals, specifically automatic terminals employing payment card readers of the contact-type.

STATE OF THE ART

Automatic payment terminals or self-service terminals, hereinafter generally referred to as "automatic terminals", are ever increasingly used to carry out money transactions.

Said automatic terminals are normally comprised of a magnetic card or microchip reader, an alpha-numerical keypad for the user to enter codes and information, and a display for displaying information allowing the user himself/herself to interact with the automatic terminal so as to carry out the desired transaction.

The use of said automatic terminals normally implies the insertion by the user of a magnetic stripe card, hereinafter simply referred to as "credit card", in the slot of the appropriate reader, and the subsequent input of a personal identification number (PIN) associated to the card, but only known to the user, on the basis of the instructions shown on the display said automatic terminal is provided with. If the automatic terminal recognises the validity of the code entered by the user and its association with the inserted card, it authorises the execution of the requested operation.

In recent years, the use of these automatic terminals has greatly increased and, along with the increase in the use thereof, events of damage to and tampering with said automatic terminals have also enormously increased, these events compromising the functionality thereof or allowing to make use of the offered services and money transfers connected thereto in a fraudulent manner.

For instance, in order for a unauthorised person to gain access to benefits restricted to another person's credit card and maybe effect unauthorised accesses to his or her money deposits, it is required to both obtain the data stored in the card, and find out the corresponding PIN or other possible means used to confirm the identity of the user of said card.

It is therefore clear that the main targets of the above said frauds include credit card readers, the step of inputting the identification data of the user and means used for such a purpose.

The most commonly used systems for such a purpose comprise the fitting of false interfaces in the slot of the magnetic card reader of the automatic terminal in order to intercept the relevant data as they are communicated during a normal transaction by the user.

Often, said false interfaces comprise an additional magnetic card reader so that the information stored in the introduced card may be read as soon as the card is inserted in the slot of the magnetic card reader of the automatic terminal. The data which are intercepted in this manner may then be used to manufacture a counterfeit card by "cloning" the original card.

In a similar manner, to obtain the PIN of the user whose card is being cloned, a false keypad may be employed, which is overlapped to the alpha-numerical keypad of the automatic terminal so that, when said user enters his or her PIN, the entered sequence is recorded by the false keypad. As an alternative, the user may simply be observed, for instance by means of a miniaturised video camera which has been appropriately hidden, while he or she is entering his or her PIN, which is thus recorded, later retrieved and used in conjunction with a counterfeit card as previously seen in order to carry out fraudulent withdrawals of funds from his or her account, these withdrawals possibly continuing even for a considerable period of time before being discovered.

Therefore, there is clearly the need (which represents the first object of the present invention) to provide a device which may counteract the practices described, so as to guarantee the secrecy of the transfer of the information connected to the use of credit cards and the like in automatic terminals. It is a further object of the present invention to provide a device for checking the correct operation of automatic terminals and the absence of tampering therewith for any purpose, with particular reference to the field of automatic terminals provided with credit card type card readers.

DETAILED DESCRIPTION OF THE INVENTION

The present invention is based on the consideration that any system for the misappropriation of confidential information connected to the use of payment cards must necessarily be able to read the information content of the magnetic stripe or microchip of the card itself by means of a reading device which is appropriately placed near to the original one employed by the automatic terminal. For this reason, the present invention provides a device which is capable of checking the conformity and the regularity of the operation of the automatic terminal and the possible tampering therewith by detecting the possible presence, at the credit card reader, of apparatuses that are external and foreign to the original automatic terminal, probably installed to misappropriate the confidential data of the users using said automatic terminal so as to clone their cards and later use them in a fraudulent manner.

The device according to the present invention operates so as to measure the relative distance of some elements which are considered to be representative of the original and correct configuration of the automatic terminal itself. In a preferred embodiment of the device, it will be associated to the credit card reader of the automatic terminal which will have to be provided with an opening configured so as to allow the installation of said device and provide the elements with reference to which the above measurement is carried out.

Figure 1:
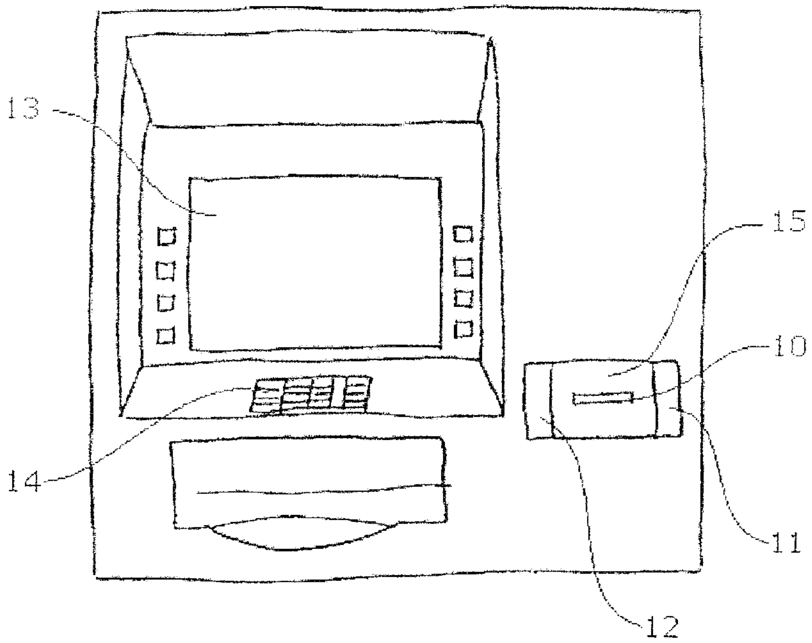
FIG. 1 shows an example of automatic payment terminal with the main components thereof highlighted.

With reference to accompanying FIG. 1, the representation of an example of automatic terminal is shown. As usual, there are a display 13, an alpha-numerical keypad 14 and a payment card reader 15 provided with a slot 10 for the introduction of the card itself.

According to the present invention, said slot 10 is provided with at least one projection 11, 12 at its sides. Within said projection there is installed a distance meter facing the possible other projection or the side opposite with respect to the slot of the credit card reader. This meter is designed and operates so as to detect the distance existing between its own position and the opposite projection (or the first obstacle encountered in such a direction) and between its own position and that of the nearest edge of the card which is inserted in the reader. The result of every measurement is compared with reference values and the result of the comparison gives rise to a possible alarm signal in case the measured values are not consistent with the "standard" ones, thus interpreting this difference as an indication that some kind of foreign body has been installed near the magnetic card reader of the automatic terminal. Said alarm signal may be accompanied by a shut down of the entire automatic terminal.

In a second possible embodiment of the present invention, said projections are respectively designed in an upper and lower position instead of laterally with respect to the slot of the magnetic card reader.

Further preferred embodiments may also have different positions for said projections, it being understood that the internal faces thereof are mutually parallel.

The measurements carried out by the device according to the present invention may be carried out when the card is inserted in the slot or when it is ejected or at both steps, thus making the check of the conformity of the automatic terminal a part of the normal operation of the automatic terminal itself. The check of the regularity of the automatic terminal carried out by the device, which is the object of the present invention, is not carried out upstream of the normal operative step, as in the antifraud systems of the state of the art, but rather during the step itself, in a dynamic and non static manner.

The distance meter employed in the device according to the present invention is preferably of the ultrasonic type, but other kinds of meter may be employed, for instance photoelectric cells or infrared ray detectors.

Figure 2:
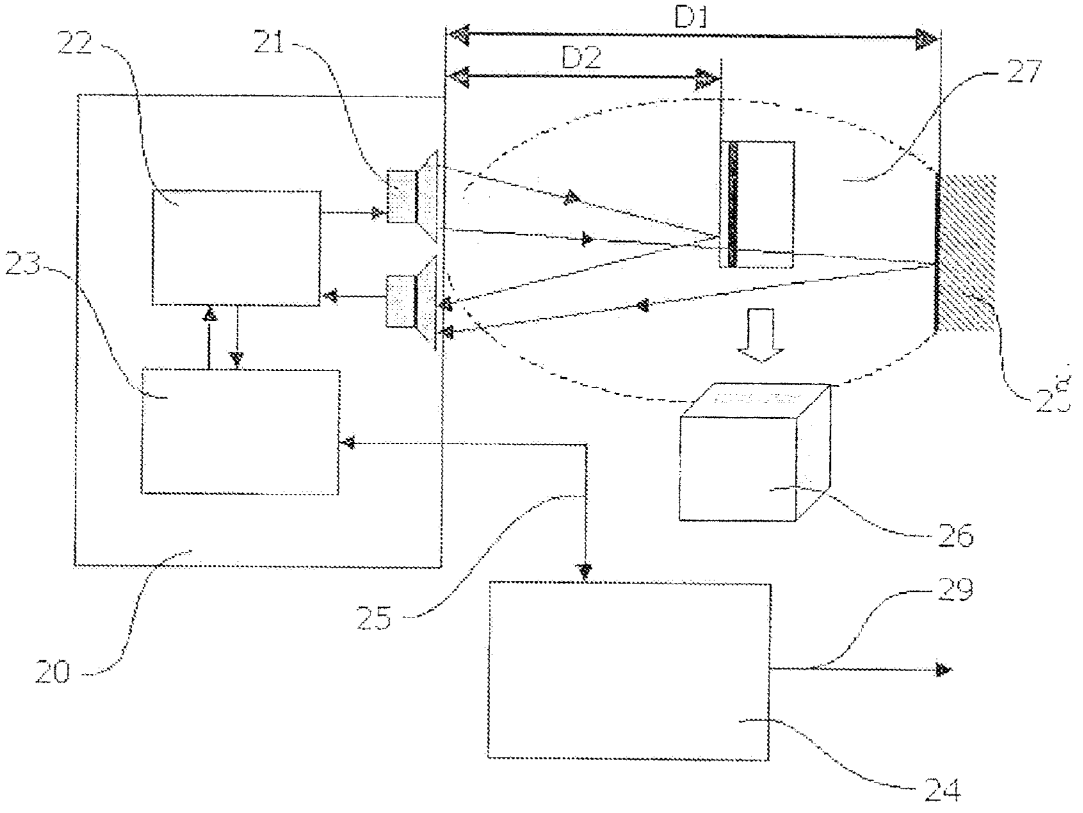
FIG. 2 shows a block diagram of the device according to the present invention.

With reference to FIG. 2, a block diagram of the device according to the present invention is shown. Said device comprises a distance detector module 20 comprising in turn at least one ultrasound transmitter capsule 21, a control module 22 for said transmission capsules and a microprocessor control module 23 associated to said control module 22 for said transmission capsules destined to calculate the detected distances and check the conformity thereof, as well as destined to communicate with external control units as, for instance, the secure controller 24 of the automatic terminal on which the device according to the present invention is installed, through an appropriate communication line 25, for instance of the serial type. Said secure controller 24 of the automatic terminal will, for instance, be of the EMV compliant type.

Said distance detector module 20 is preferably inserted within one of said two projections 11, 12 and provides for measuring two distances: the first related to the card introduced in the slot of the reader 26, the other related to the opposite projection when present, or, as an alternative, related to the first obstacle encountered in this direction. The presence of a second projection leads the insertion of foreign apparatuses to be even more difficult near the slot of the card reader of the automatic terminal, but the presence of foreign bodies altering in any case the value of the reading carried out in regular conditions may be determined also in the absence thereof.

During the operation of the device according to the present invention, said distance detector module 20 constantly keeps under control the critical area 27 surrounding the slot of the card reader of the automatic terminal. The microprocessor 23 checks the measured distance in relation to the operative step communicated by the secure controller 24 of the automatic terminal through the communication line 25.

Through the same communication line 25, said controller 24 of the automatic terminal constantly checks the presence of said distance detector module 20 and its correct operation through appropriate control messages, which are possibly encrypted and with data varying according to a predetermined algorithm. In this manner, an interruption of the communication line 25 or the identification of a reply message which is different from what is expected (on the basis of the chosen encryption scheme) determines an error condition which will be interpreted by said secure controller 24 of the automatic terminal as a malfunction, and an alarm signal 29, which may determine the interruption of the service itself, will correspondingly be generated.

Still with reference to FIG. 2, the distance detector module 20 will check that the distances D1 and D2, in the corresponding operative steps communicated by the controller 24, fall within a tolerance set during the production step and closely related to the position of the reference wall 28 (in a resting position, i.e. in the absence of a magnetic card), that is the position of the magnetic card in case the step is that of insertion and/or ejection of the card itself. The determined measurements will be related to the shorter distance with respect to the object of the measurement itself or may comprise a certain number of "rebounds" of the ultrasound or infrared ray beam employed, so as to perform complex paths capable of monitoring broader areas.

The distance detector module 20 thus communicates the result of the measurements to the controller 24 of the automatic terminal, which will preferably be of the secure type, that is tampering-proof, and subsequently said controller 24 takes care of recognising an operative condition which is not consistent with what is expected (as the reference distances have been altered), with a resulting error message 29 and possible subsequent shut down of the terminal.

Typically, the recovery of the operative conditions requires the intervention of authorised personnel in order to provide for removing the causes for the difference, which may be due, for instance, to the insertion of a fraudulent device placed in front of the aperture of the reader.

In further preferred embodiments of the device according to the present invention, said distance detector module 20 is designed so as to be hard to tamper with and to block access to its component parts, for instance by means of coating or similar techniques.

The object device of the present invention may be employed in automatic terminals of the OPT (Outdoor Payment Terminal) or CRIND (Card Reader In Dispenser) type, which are installed in particular at service areas for the sale of fuel.

The invention claimed is:

1. A device for checking the regularity of the operation of automatic payment terminals comprising:

a distance detector module associated to a payment card reader of an automatic payment terminal, said distance detector module measuring a distance existing between a position of the distance detector module and at least one further element related to said automatic payment terminal or to the payment card engaged in said card reader or to both, wherein said distance detector module includes a control module configured to communicate with an external control unit so as to check conformity of the measured distance.

2. The device according to claim 1, wherein said distance detector module is of an ultrasonic type.

3. The device according to claim 2, wherein said distance detector module comprises at least one ultrasound transmitter capsule, a first control module of said at least one ultrasound transmitter capsule, and a second control module, associated to said first control module, adapted to calculate the distances detected by said at least one ultrasound transmitter capsule and to check the conformity with the external control unit through a communication line.

4. The device according to claim 3, wherein said communication line is of a serial type.

5. The device according to claim 4, that wherein said second control module comprises a microprocessor.

6. The device according to claim 4, wherein said external control unit comprises a secure controller of said automatic payment terminal.

7. The device according to claim 4, wherein said secure controller of said automatic payment terminal is compliant with the Europay, MasterCard, Visa ("EMV") standard.

8. The device according to claim 1, wherein the measured distance is represented by a quantity from which an actual distance can be determined.

9. An automatic payment terminal comprising:

a display;

an alphanumerical keypad;

a payment card reader provided with a slot for introduction of a payment card; and a secure controller comprising a device for checking the regularity of the operation of automatic payment terminals, wherein the device includes a distance detector module associated with the payment card reader, wherein the distance detector module is configured to measure a first distance between a payment card inserted into the slot and the distance detector module and a second distance between an element of the automatic payment terminal and the distance detector module, wherein the distance detector module includes a control module configured to establish quantities representative of the first and second distances.

10. The automatic payment terminal according to claim 8 comprising at least one projection arranged laterally with respect to said slot for the introduction of said payment card and adapted to house at least one ultrasound transmitter capsule included in said device for checking the regularity of the operation of automatic payment terminals.

11. The automatic payment terminal according to claim 10 comprises comprising two projections arranged laterally with respect to said slot for the introduction of said payment card, a first of said two projections adapted to house said at least one ultrasound transmitter capsule included in said device for checking the regularity of the operation of automatic payment terminals, a second of said two projections adapted to provide a reference for the measuring performed by said device for checking the regularity of the operation of automatic payment terminals.

12. The automatic payment terminal according to claim 11, wherein said device for checking the regularity of the operation of automatic payment terminals carries out two measurements, a first measurement of the distance between said ultrasound transmitter capsule, housed in the first of said two projections, and the second of said two projections, and a second measurement of the distance between said ultrasound transmitting capsule and an edge of the payment card engaged in said card reader.

13. The automatic payment terminal according to claim 12, wherein said two measurements are carried out when the payment card is inserted in said card reader.

14. The automatic payment terminal according to claim 12, wherein said that two measurements are carried out when the payment card is ejected from said card reader.

15. The automatic payment terminal according to claim 14, wherein the automatic payment terminal is included in the group comprising terminals of the OPT, CRIND types and automatic terminals for the sale of fuel in service stations.

16. The automatic payment terminal according to claim 9, wherein the automatic payment terminal comprises a fuel dispenser.

17. A method for checking the regularity of the operation of an automatic payment terminal comprising a housing including a payment card reader configured to receive a payment card and a distance detector associated with the payment card reader, the method comprising the steps of:

determining a first distance between the distance detector and a portion of the housing opposite the distance detector with respect to the payment card reader;

measuring a second distance by the distance detector in the direction of the payment card reader;

comparing the first and second distances; and determining the presence of an obstacle proximate the payment card reader based on the comparison of the first and second distances.

18. The method of claim 17 comprising the steps of:

determining a third distance between the distance detector and the payment card when inserted into the payment card reader;

measuring a fourth distance by the distance detector in the direction of the payment card reader;

comparing the third and fourth distances; and determining the presence of the obstacle based on the comparison of the third and fourth distances.

* * * * *

UNITED STATES PATENT AND TRADEMARK OFFICE

CERTIFICATE OF CORRECTION

PATENT NO. : 8,132,721 B2
APPLICATION NO. : 12/294189
DATED : March 13, 2012
INVENTOR(S) : Giovanni Carapelli It is certified that error appears in the above-identified patent and that said Letters Patent is hereby corrected as shown below:

Column 5, line 1, Please delete “that”.

Column 5, line 36, Please delete “comprises”.

Signed and Sealed this
Twenty-fourth Day of July, 2012

David J. Kappos
*Director of the United States Patent and Trademark Office*